(12) United States Patent
Leung et al.

(10) Patent No.: US 7,349,425 B2
(45) Date of Patent: Mar. 25, 2008

(54) METHOD AND APPARATUS FOR OVERHEAD MESSAGING IN A WIRELESS COMMUNICATION SYSTEM

(75) Inventors: Nikolai K. N. Leung, Takoma Park, MD (US); Ragulan Sinnarajah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/933,971

(22) Filed: Aug. 20, 2001

(65) Prior Publication Data

US 2003/0228861 A1 Dec. 11, 2003

Related U.S. Application Data

(60) Provisional application No. 60/279,970, filed on Mar. 28, 2001.

(51) Int. Cl.
*H04J 3/16* (2006.01)

(52) U.S. Cl. .................................. 370/465; 370/469
(58) Field of Classification Search .................. None
See application file for complete search history.

(56) References Cited

U.S. PATENT DOCUMENTS

| 5,101,501 | A | | 3/1992 | Gilhousen et al. |
| 5,887,252 | A | * | 3/1999 | Noneman ................ 370/335 |
| 6,018,360 | A | * | 1/2000 | Stewart et al. .......... 348/14.09 |
| 6,032,197 | A | | 2/2000 | Birdwell et al. |
| 6,047,071 | A | * | 4/2000 | Shah ........................ 380/273 |
| 6,111,866 | A | * | 8/2000 | Kweon et al. ............ 370/335 |
| 6,195,546 | B1 | * | 2/2001 | Leung et al. ............. 455/419 |
| 6,208,634 | B1 | * | 3/2001 | Boulos et al. ............ 370/342 |
| 6,230,024 | B1 | * | 5/2001 | Wang et al. .............. 455/557 |
| 6,363,242 | B1 | * | 3/2002 | Brown, Jr. et al. ........ 455/70 |
| 6,510,515 | B1 | | 1/2003 | Raith |
| 6,519,266 | B1 | * | 2/2003 | Manning et al. .......... 370/469 |
| 6,549,771 | B2 | * | 4/2003 | Chang et al. ............. 455/419 |
| 6,571,109 | B1 | * | 5/2003 | Kim ........................... 455/555 |
| 6,654,384 | B1 | * | 11/2003 | Reza et al. ................ 370/469 |
| 6,711,182 | B1 | * | 3/2004 | Gibbs et al. .............. 370/537 |

(Continued)

FOREIGN PATENT DOCUMENTS

EP  1024661  8/2000

(Continued)

OTHER PUBLICATIONS

Handley, M. et al., "SDP: Session Description Protocol" *IETF RFC* 2327, Apr. 1998, p. 1-40 XP002101463.

(Continued)

*Primary Examiner*—Andrew C. Lee
(74) *Attorney, Agent, or Firm*—Roberta A. Young; Tom Rouse

(57) ABSTRACT

Method and apparatus for providing a broadcast system parameter message in a wireless communication system supporting a broadcast service. In one embodiment, the message identifies a service option number corresponding to a set of broadcast parameters. In an alternate embodiment, the message identifies a block of bytes corresponding to broadcast parameters. The message may be transmitted on a channel for transmitting overhead information. For a system supporting a broadcast service, the message identifies a protocol stack for processing broadcast content.

12 Claims, 19 Drawing Sheets

U.S. PATENT DOCUMENTS

| | | | |
|---|---|---|---|
| 6,760,602 B2 * | 7/2004 | Tangorra et al. | 455/561 |
| 6,765,909 B1 * | 7/2004 | Sen et al. | 370/392 |
| 6,792,048 B1 * | 9/2004 | Lee et al. | 375/240.26 |
| 6,819,930 B1 * | 11/2004 | Laroia et al. | 455/450 |
| 6,826,406 B1 * | 11/2004 | Vialén et al. | 455/450 |
| 6,882,850 B2 * | 4/2005 | McConnell et al. | 455/553.1 |

FOREIGN PATENT DOCUMENTS

| | | |
|---|---|---|
| WO | 0036804 | 6/2000 |

OTHER PUBLICATIONS

Burmeister C., et al. "Robust Header Compression (ROHC)" Internet Draft, Dec. 2000, pp. 1-122, XP002901751 (pp. 4-5).

"Universal Mobile Telecommunications System (UMTS); Radio Interface for Broadcast/Multicast Services (3GPP TR 25.925 version 3.3.0 Release 1999)" ETSI TR 125 925 V3.3.0. Dec. 1, 2000, pp. 1-35, XP002230388, pp. 17-18; Figure 6.5.

* cited by examiner

| LAYER | PROTOCOLS AND SELECTED OPTIONS FOR SERVICE OPTION XX |
|---|---|
| APPLICATION | MPEG-4 VISUAL, EVRC AUDIO, RTP PAYLOAD TYPES |
| TRANSPORT | RTP/UDP PORT NUMBER |
| SECURITY | UNSPECIFIED |
| NETWORK | IP |
| HEADER COMPRESSION | ROHC |
| LINK | HDLC-TYPE FRAMING |
| RLP | NULL |
| MULTIPLEX | BSPM |
| PHYSICAL | BSPM |

FIG. 4

| | |
|---|---|
| NGHBR_PN | 9 |
| NGHBR_FBSCH_CODE | 1 |
| NGHBR_FBSCH_CODE_CHAN | 0 OR 11 |
| HSBS_ID | 0 OR 5 |
| BSR_ID | 3 |
| HSBS_ID | 3 |
| FBSCH_ID | 3 |
| FBSCH_ID | 3 |

| | |
|---|---|
| PILOT_PN | 9 |
| BSPM_MSG_SEQ | 6 |
| HSBS_REG_USED | 1 |
| HSBS_REG_TIMER | 0 OR 5 |
| NUM_FBSCH | 3 |
| NUM_HSBS_SESSION | 3 |
| NUM_LPM_ENTRIES | 3 |
| FBSCH_ID | 3 |
| FREQ_INCL | 1 |
| FBSCH_CDMA_FREQ | 0 OR 11 |
| FBSCH_CODE_CHAN | 11 |
| FBSCH_RC | 5 |
| FBSCH_RATE | 4 |
| FBSCH_FRAME_SIZE | 2 |
| FBSCH_FRAME_REPEAT_IND | 1 |
| FBSCH_SHO_SUPPORTED | 1 |
| NUM_NGHBR | 0 OR 6 |

FIG. 16

| LAYER | PROTOCOLS | BROADCAST SERVICE BLOB FIELDS |
|---|---|---|
| APPLICATION | IDENTIFIED IN BLOB | VISUAL/AUDIO CODECS, PROFILES, RTP PAYLOAD TYPES |
| TRANSPORT | IDENTIFIED IN BLOB | TRANSPORT PROTOCOL, UDP PORT NUMBER |
| SECURITY | UNSPECIFIED | |
| NETWORK | IP | |
| HEADER COMPRESSION | IDENTIFIED IN BLOB | HEADER COMPRESSION ALGORITHM & PARAMETERS |
| LINK | HDLC-LIKE FRAMING | |
| RLP | NULL | |
| MULTIPLEX | IDENTIFIED IN BSPM | |
| PHYSICAL | IDENTIFIED IN BSPM | |

FIG. 17

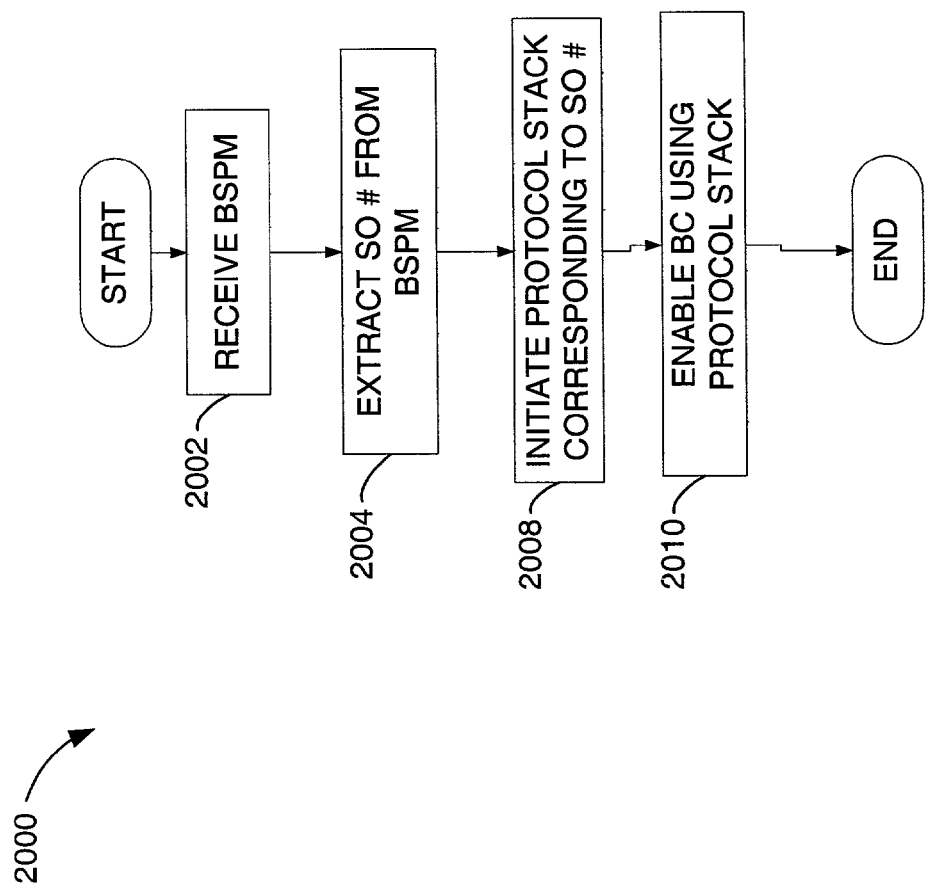

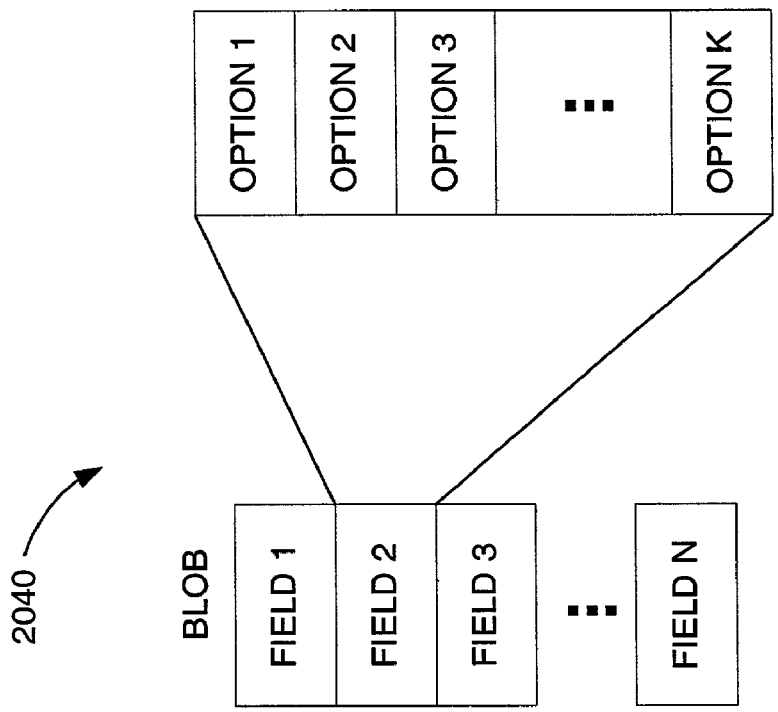
FIG. 20
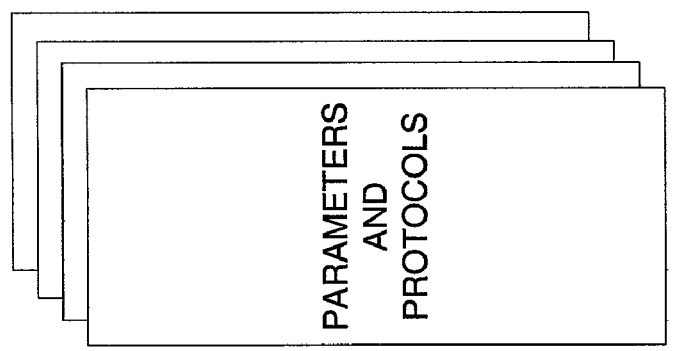
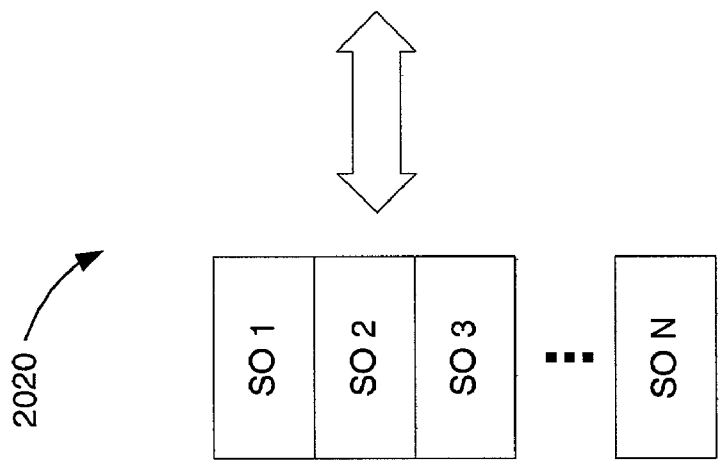
FIG. 19

METHOD AND APPARATUS FOR OVERHEAD MESSAGING IN A WIRELESS COMMUNICATION SYSTEM

CLAIM OF PRIORITY UNDER 35 U.S.C. §120

The present Application for Patent claims priority of U.S. Provisional Application No. 60/279,970, filed Mar. 28, 2001, assigned to the assignee hereof and hereby expressly incorporated by reference herein.

REFERENCE TO CO-PENDING APPLICATIONS FOR PATENT

The present invention is related to the following Applications for Patent in the U.S. Patent & Trademark Office:

"Method and Apparatus for Security in a Data Processing System" by Philip Hawkes et al., having application Ser. No. 09/933,972, filed Aug. 20, 2001, and assigned to the assignee hereof, and which is expressly incorporated by reference herein;

"Method and Apparatus for Out-of-Band Transmission of Broadcast Service Option in a Wireless Communication System" by Nikolai Leung, having application Ser. No. 09/934,021, filed Aug. 20, 2001, and assigned to the assignee hereof, and which is expressly incorporated by reference herein;

"Method and Apparatus for Broadcast Signaling in a Wireless Communication System" by Nikolai Leung, having application Ser. No. 09/933,914, filed Aug. 20, 2001, and assigned to the assignee hereof, and which is expressly incorporated by reference herein;

"Method and Apparatus for Transmission Framing in a Wireless Communication System" by Raymond Hsu, having application Ser. No. 09/933,639, filed Aug. 20, 2001, and assigned to the assignee hereof, and which is expressly incorporated by reference herein;

"Method and Apparatus for Data Transport in a Wireless Communication System" by Raymond Hsu, having application Ser. No. 09/933,977, filed Aug. 20, 2001, now U.S. Pat. No. 6,707,801, and assigned to the assignee hereof, and which is expressly incorporated by reference herein;

"Method and Apparatus for Header Compression in a Wireless Communication System" by Raymond Hsu, having application Ser. No. 09/933,690, filed Aug. 20, 2001, and assigned to the assignee hereof, and which is expressly incorporated by reference herein;

BACKGROUND

1. Field

The present invention relates to wireless communication systems generally, more specifically, to methods and apparatus for message compression in preparation for transmission in a wireless communication system.

2. Background

There is an increasing demand for packetized data services over wireless communication systems. As traditional wireless communication systems are designed for voice communications, the extension to support data services introduces many challenges. Specifically, provision of unidirectional services, such as broadcast service where video and audio information is streamed to a subscriber, has a unique set of requirements and goals. Such services may have large bandwidth requirements, wherein system designers seek to minimize transmission of overhead information. Additionally, the subscriber requires specific information to access the broadcast transmissions, such as processing parameters and protocols. A problem exists in transmitting the broadcast-specific information while optimizing use of available bandwidth.

There is a need, therefore, for an efficient and accurate method of transmitting data in a wireless communication system. Further, there is a need for an efficient and accurate method of providing service-specific information to a user.

SUMMARY

Embodiments disclosed herein address the above stated needs by providing a method for providing service-specific parameters and protocols to a user in a wireless communication system supporting a broadcast service or other unidirectional transmission service.

According to one aspect, in a wireless communication system supporting a broadcast service, a method includes generating a broadcast service protocol message, and transmitting the broadcast service protocol message to multiple mobile receivers, wherein the broadcast service protocol message includes a service option number identifying a set of parameters, wherein the set of parameters describes processing of broadcast content.

In another aspect, in a wireless apparatus supporting a broadcast service, a method includes receiving a broadcast service parameter message, extracting a service option number from the broadcast service parameter message and initiating a protocol stack corresponding to the service option number.

In still another aspect, a wireless apparatus includes means for receiving a broadcast service parameter message, means for extracting a service option number from the broadcast service parameter message, and means for initiating a protocol stack corresponding to the service option number.

BRIEF DESCRIPTION OF THE DRAWINGS

FIG. 4 is a table of protocols applied to layers of a protocol stack supporting a broadcast service option in a wireless communication system.

FIG. 16 is a system overhead parameter message configuration.

FIG. 17 is a block of bits system overhead parameter message configuration.

FIG. 18 is a flow diagram for provision of broadcast protocols and parameters in a wireless communication system.

FIG. 19 is a mapping of service option numbers to parameter sets.

FIG. 20 illustrates parameter definition in a wireless communication system.

DETAILED DESCRIPTION

Figure 1:
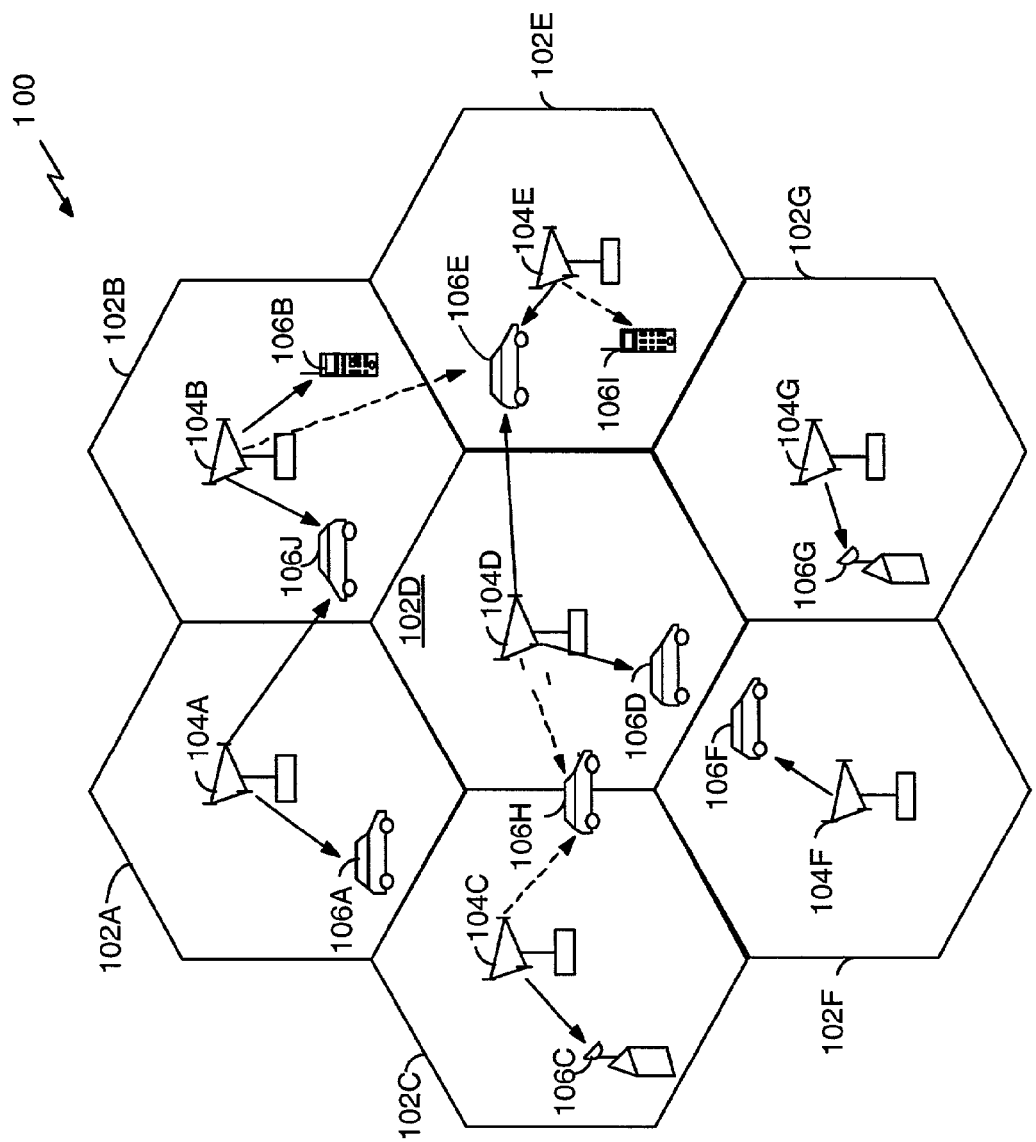
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the present invention are presented in drawings, the drawings are not necessarily drawn to scale unless specifically indicated.

An exemplary embodiment of a wireless communication system employs a method of header compression that reduces the size of each header while satisfying the accuracy and transmission requirements of the system. The exemplary embodiment supports a uni-directional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the size of any overhead associated with such broadcast transmission.

The following discussion develops the exemplary embodiment by first presenting a spread-spectrum wireless communication system generally. Next, the broadcast service is introduced, wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a uni-directional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the WCDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma2000 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System," which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
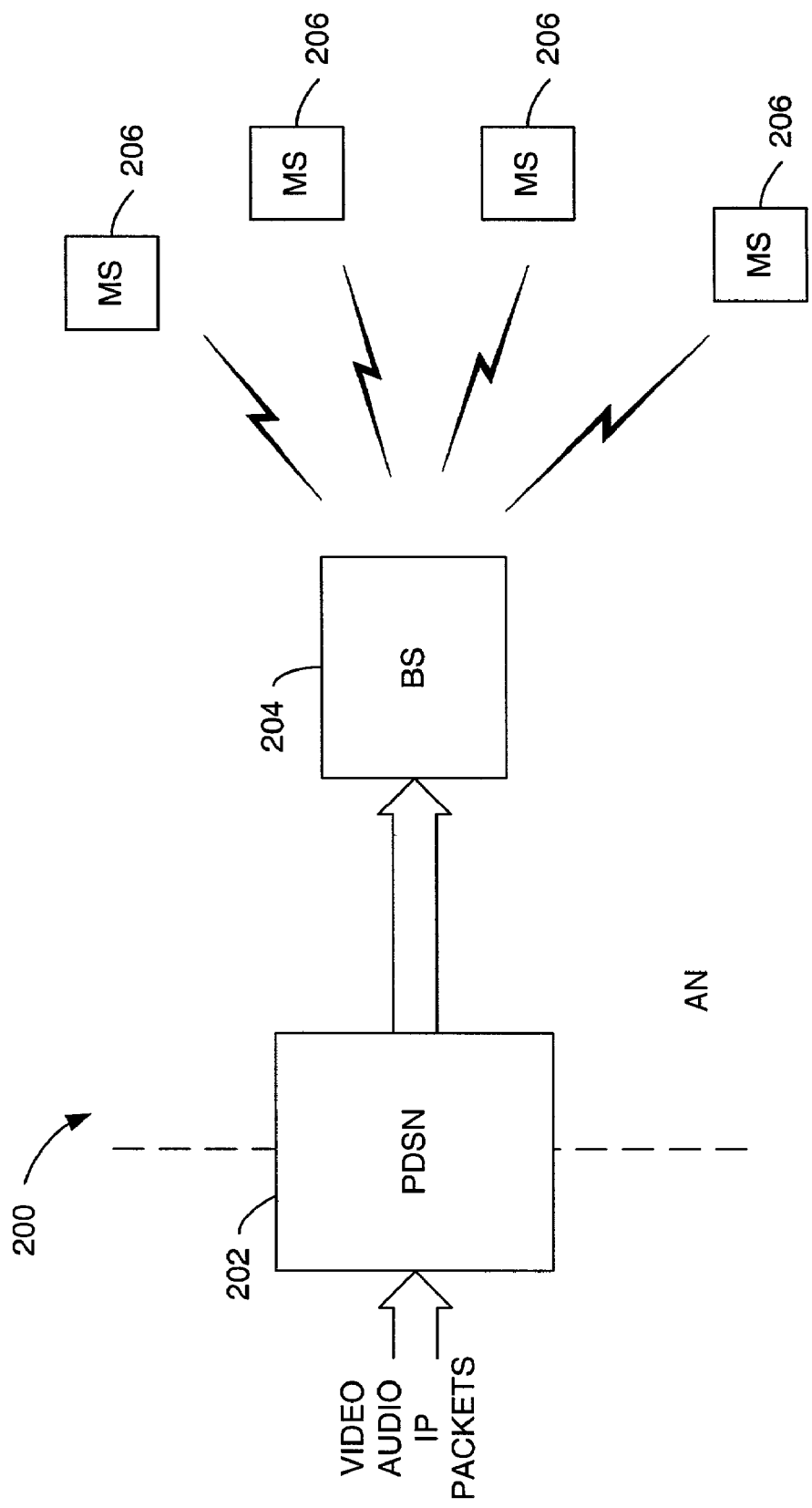
FIG. 2 is a block diagram of the communication system supporting broadcast transmissions.

A wireless communication system 200 is illustrated in FIG. 2, wherein video and audio information is provided to Packetized Data Service Network (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code, that carries broadcast traffic. The Broadcast Channel, BCH, corresponds to a single CDM channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a service provider is referred to as a Content Server (CS), wherein the CS advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast content may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into sub-streams of lower rates.

One embodiment also supports group calls in several different ways. For example, by using existing unicast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the F-BSCH of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing of the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Model

There are several possible subscription/revenue models for HSBS service, including free access, controlled access, and partially controlled access. For free access, no subscription is needed by the to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not being able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
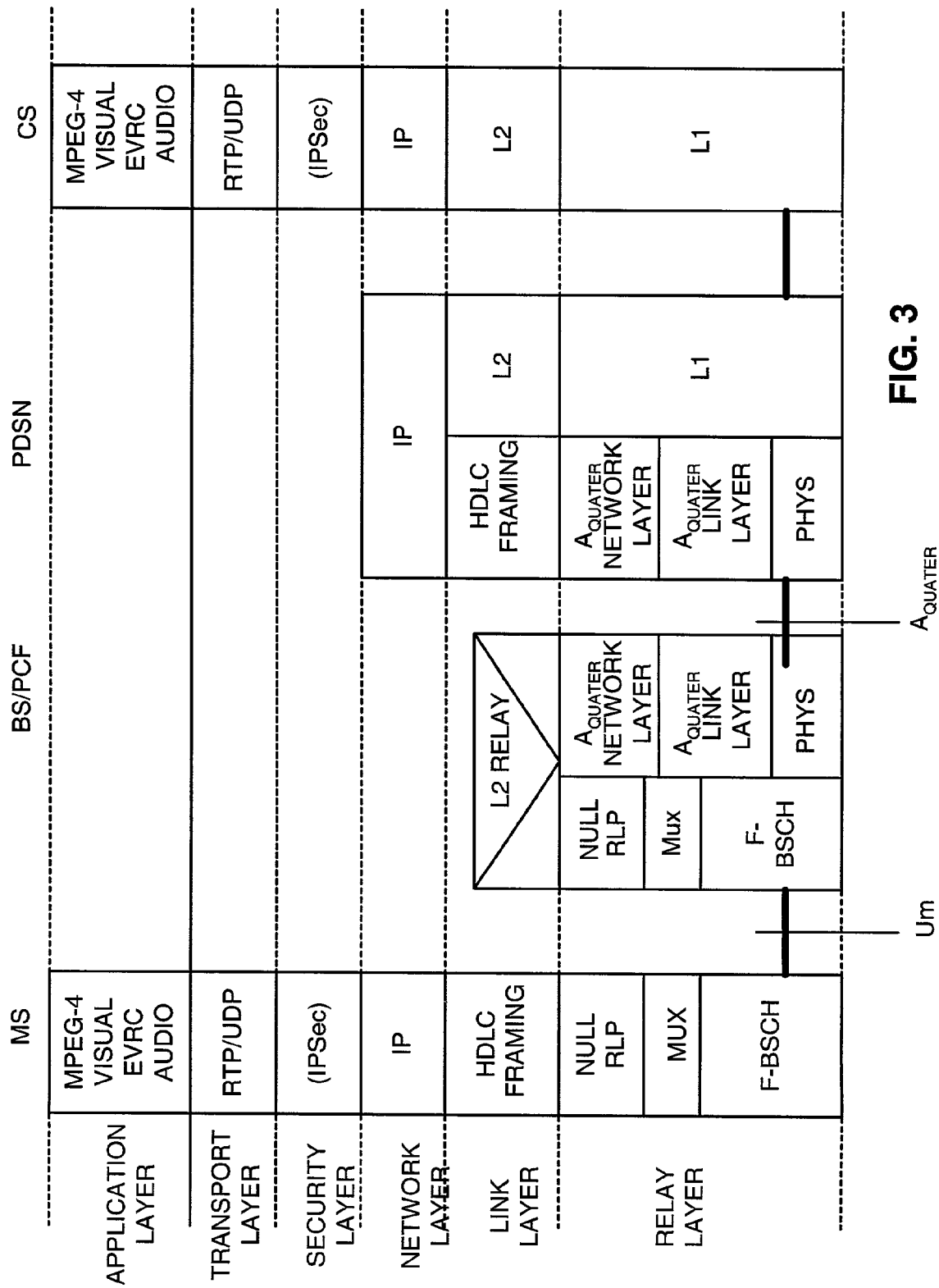
FIG. 3 is a model of the protocol stack corresponding to a broadcast service option in a wireless communication system.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port to be used to carry the RTP packets. The security layer of the MS is specified by the protocol, wherein security parameters are provided via out-of-band channels when the security association is initially established with the CS. The link layer specifies the IP header compression parameters.

In order for the mobile stations to discover and listen to broadcast channels successfully, various broadcast service related parameters are transmitted over the air interface. The broadcast service is designed to support different protocol options in the protocol stack. This requires the receivers of the broadcast service be informed of the protocol options selected to facilitate proper decoding and processing of the broadcast. In one embodiment, the CS provides this information to the receiver as an overhead system parameter message, consistent with cdma2000 standard. The advantage to the receiver is the ability to receive the information immediately from the overhead message. In this way, the receiver may immediately determine whether the receiver has sufficient resources to receive the broadcast session. The receiver monitors the overhead system parameter messages. The system may implement a service option number corresponding to a set of parameters and protocols, wherein the service option number is provided in the overhead message. Alternately, the system may provide a set of bits or flags to indicate the different protocol options selected. The receiver then determines the protocol options for decoding the broadcast session correctly.

The broadcast channel is a physical channel defined to carry broadcast traffic. There are several possible physical layer formats that can be used for a given broadcast channel, and therefore, the mobile station receivers require information about these parameters to successfully decode the physical transmission of the broadcast channel. Specifically, each broadcast channel, HSBS channel, has a unique identifier in the system. Additionally, for each HSBS channel the BS assigns a Broadcast Service Reference Identifier, wherein the base station sets the field corresponding to the current Broadcast Service Session. The broadcast service will then transmit information for each HSBS channel including: the broadcast channel identifier and the broadcast service reference identifier.

Further, the broadcast channel may incorporate various combinations of upper layer protocols, based on the type of content being delivered. The mobile receiver also requires information relating to these upper layer protocols for interpretation of the broadcast transmissions. According to one embodiment, the protocol stack is communicated via out-of-band methods, wherein out-of-band method indicates the transmission of information via a separate channel distinct from the broadcast channel. With this approach, the description of the upper layer protocol stack is not transmitted over the broadcast channel or overhead system parameters channel.

As discussed hereinabove, the service option defines the protocol stack and the procedures used for operating the broadcast service. Consistent with a unidirectional service, the broadcast service is characterized by protocol options common among multiple broadcast receivers. In the exemplary embodiment, protocol options for the broadcast service are not negotiated between the mobile station and the network. The options are predetermined by the network and are provided to the mobile station. As the broadcast service is a unidirectional service, the broadcast service does not support requests from the mobile station. Rather the concept of the broadcast service is similar to a television transmission, wherein receivers tune in to the broadcast channel and access the broadcast transmission using the parameters specified by the CS.

Figure 15:
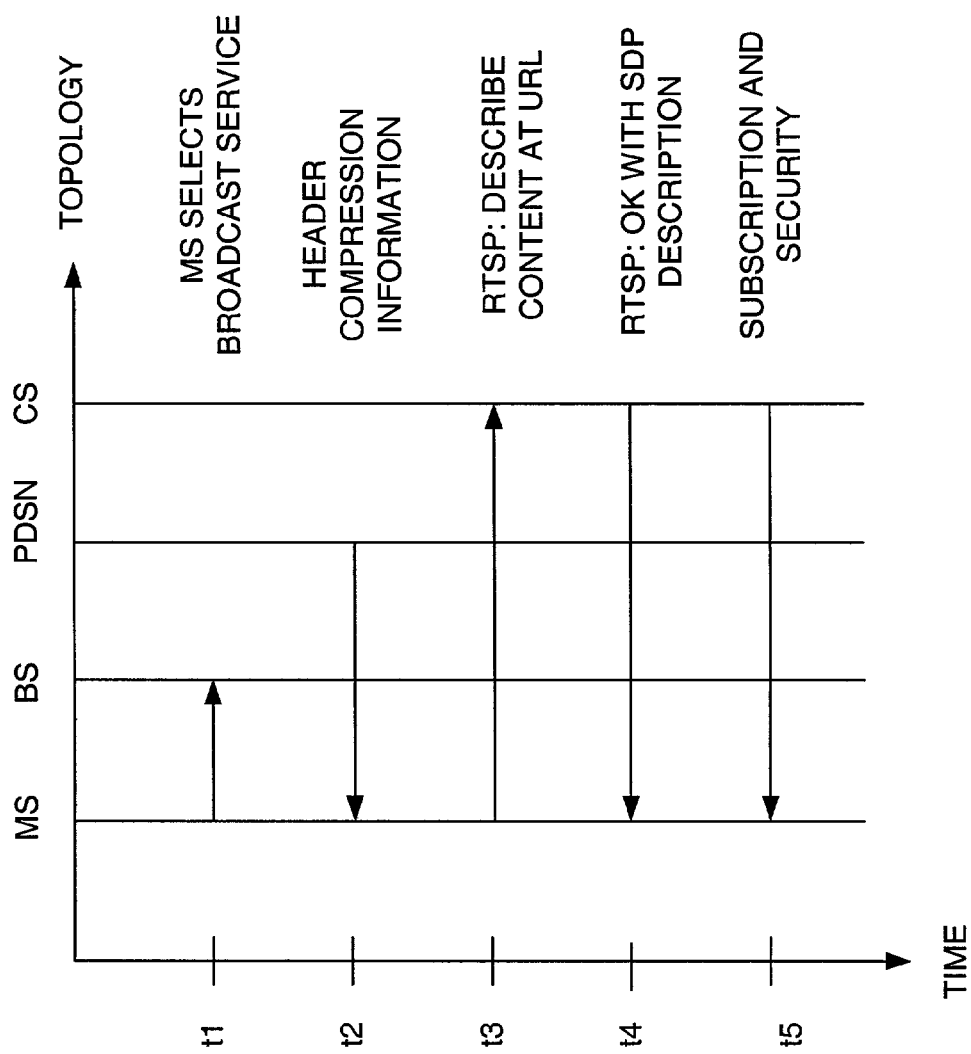
FIG. 15 is a timing diagram of a message flow in a wireless communication system.

To avoid requiring coordination between the wireless network and CS, the service can use out-of-band channels for transmitting information to the mobile station regarding the protocol options above the IP network layer. FIG. 15 illustrates a broadcast flow according to one embodiment. The horizontal axis represents the topology of the system, i.e., infrastructure elements. The vertical axis represents the time line. At time t1 the MS accesses the out-of-band channel via the BS. Note that the MS may access the network by selecting a packet data service option, such as by using a dedicated packet data service option channel designated as SO 33. Effectively, the MS selects a packet data service option to establish a Real Time Streaming Protocol (RTSP) session with the CS. The MS requests a description of the application and transport protocols used for the broadcast stream from the CS at time t3. Note that in addition to the use of RTSP, the Session Initiation Protocol (SIP) may also be used to request the description of the application and transport protocols. The description is carried via Session Description Protocol (SDP) at time t4. Transmission of the protocol may be performed while the user is accessing the broadcast service. Note that RTSP and SDP are standardized approaches for establishing a unidirectional streaming service in IETF and in 3GPP2. The mobile station will also use a packet data service to request the PDSN to identify the broadcast service header compression protocol and relay any compression initialization information to the mobile station at time t2. In one embodiment, Internet Protocol Control Protocol (IPCP) is used to exchange the header compression information with the mobile station. Similarly, this same mechanism may be extended to provide information for the broadcast stream.

If the broadcast service protocol options change the mobile station requires notification. One embodiment applies a Security Parameters Index (SPI) to indicate when protocol options may have changed. If the protocol options change as a result of using a different CS for the system, or the mobile station handing off to a different system, the SPI will change automatically because the source IP address of the CS changes. Furthermore, if the CS does not change and the same one is used with different protocol options, the CS will be required to change the SPI to indicate that the parameters have changed. When the mobile station detects this new SPI, it will obtain the new protocol description by setting-up a packet data service call and contacting the PDSN and CS whose IP address is included in the SPI.

In one embodiment, the SPI approach applies several criteria. Firstly, a single CS uses the same protocol options for consecutive streaming sessions, else the CS modifies the SPI when the protocol options change. Secondly, the PDSN does not change the header compression algorithm or the parameters between streaming sessions with the same SPI.

The change of protocol options in a given system triggers multiple mobile stations to set-up a packet data service call to retrieve the updated protocol descriptions. Randomized call set-up delays should be introduced to prevent the system from being overloaded by these call originations. Content servers may introduce some delay between the time the SPI is changed and the content stream begins to allow all users to retrieve the protocol options.

In contrast the broadcast channel protocols and parameters may be transmitted to the mobile station. In an alternate embodiment, a Service Option (SO) number is assigned to each set of broadcast protocols and parameters, wherein the SO number is transmitted to the multiple receivers. In a derivation thereof, the parameter information is transmitted to the multiple receivers directly as a plurality of coded fields. The former method of identifying broadcast protocols and parameters by the SO number, incorporates a Broadcast Service Parameters Message (BSPM). This BSPM is an overhead message specific to the broadcast service. Those mobile stations desiring to receive the HSBS service would monitor the BSPM. The BSPM is continuously; transmitted periodically by each sector that has configured one or more broadcast channels.

The format of the BSPM of the exemplary embodiment is illustrated in FIG. 16. The various parameters indicated in the message are listed with the number of bits allocated in the message for each. The pilot PN sequence offset index is identified as PILOT_PN. The BS sets the PILOT_PN field to the pilot PN sequence offset for the corresponding base station in units of 64 PN chips. The BSPM_MSG_SEQ refers to a broadcast service parameters message sequence number. When any of the parameters identified in a current BSPM has changed since the previous transmission of the BSPM, the BS increments the BSSPM_CONFIG_SEQ. The HSBS_REG_USED is a broadcast service registration used indicator. This field indicates the frequencies used for paging a MS subscriber to the broadcast service. The HSBS_REG_TIME is a broadcast service registration timer value. If the field HSBS_REG_USED is set to '0', the base station will omit this field. Else, the base station includes this field with significance given as: the BS sets this field to the length of the registration duration for the broadcast service channels; or the base station sets this field to '00000' if the MS is required to register the HSBS channel each time it starts to monitor a HSBS channel.

Continuing with FIG. 16, the NUM_FBSCH is the number of forward broadcast supplemental channels. The BS sets this field to the number of forward broadcast supplemental channels transmitted by the corresponding BS. The NUM_HSBS_SESSION is a number of broadcast service sessions. The BS sets this field to the number of broadcast service sessions being transmitted by the corresponding BS. The NUM_LPM_ENTRIES are the number of logical-to-physical mapping entries. The BS sets this field to the number of logical, i.e., broadcast service sessions, to physical, i.e. forward broadcast supplemental channel, mapping entries carried in this message. The BS sets a Forward Broadcast Supplemental Channel Identifier, FBSCH_ID, corresponding to the forward broadcast supplemental channel. If the CDMA_FREQ field is included in this record, the base station shall set the Frequency included indicator, FREQ_INCL, bit to '1'; otherwise, the base station will set the bit to '0'.

FBSCH_CDMA_FREQ is the frequency assignment of the forward broadcast supplemental channel. If the FREQ_INCL bit is set to '0', the base station shall omit this field; otherwise, the base station sets this field as follows: the base station shall set this field to the CDMA Channel number corresponding to the CDMA frequency assignment for the CDMA Channel containing the Forward Broadcast Supplemental Channel.

The FBSCH_CODE_CHAN is a code channel index of the forward broadcast supplemental channel, wherein the base station sets this field to the code channel index that the mobile station is to use on the forward broadcast supplemental channel. The FBSCH_RC is a radio configuration of the forward broadcast supplemental channel, wherein the BS sets this field to the radio configuration to be used by the mobile station on the forward broadcast supplemental channel.

The FBSCH_RATE is the data rate of the forward broadcast supplemental channel, wherein the base station sets this field to the data rate used on the forward broadcast supplemental channel. The FBSCH_FRAME_SIZE is the frame size of the forward broadcast supplemental channel, wherein the base station sets this field to the frame size on the forward broadcast supplemental channel. The FBSCH_FRAME_REPEAT_IND is the Forward Broadcast Supplemental Channel Frame Repeat Indicator, wherein if frame repetition is used on the Forward Broadcast Supplemental Channel, the base station sets this field to '1'; else, the base station sets this field to '0'.

The FBSCH_SHO_SUPPORTED is the Forward Broadcast Supplemental Channel Soft Handoff Supported Indicator, wherein if the base station supports soft handoff on the Forward Broadcast Supplemental Channel with one or more of it's neighbors, the base station sets this field to '1'; otherwise, the base station sets this field to '0'.

The NUM_NGHBR is the number of neighbors supporting forward broadcast supplemental channel soft handoff. If the field FBSCH_SHO_SUPPORTED is set to '1', then the base station will set this field to the number of neighbors supporting soft handoff on this Forward Broadcast Supplemental Channel. The NGHBR_PN is the neighbor pilot PN sequence offset index. The base station sets this field to the pilot PN sequence offset for this neighbor, in units of 64 PN chips. The NGHBR_FBSCH_CODE_CHAN_INCL is the neighbor pilot forward broadcast supplemental channel code channel index included indicator. If the neighbor pilot Forward Broadcast Supplemental Channel Code Channel index is included in this message, the base station sets this field to '1'; otherwise, the base station sets this field to '0'. The NGHBR_FBSCH_CODE_CHAN is the neighbor pilot Forward Broadcast Supplemental Channel Code Channel Index. If the NGHBR_FBSCH_CODE_CHAN_INCL field is set to '0', the base station omits this field; otherwise, the base station includes this field and the BS sets this field to the code channel index that the mobile station is to use on this Forward Broadcast Supplemental Channel on this neighbor.

The HSBS_ID is a broadcast service session identifier, wherein the base station shall set this field to the identifier corresponding to this Broadcast Service Session. The BSR_ID is a broadcast service reference identifier, wherein the base station shall set this field to the broadcast service reference identifier corresponding to this broadcast service session. The HSBS_ID is the broadcast service session identifier, wherein the BS shall set this field to the identifier corresponding to the broadcast service session.

The FBSCH_ID is the forward broadcast supplemental channel identifier, wherein the base station shall set this field to the identifier corresponding to the forward broadcast supplemental channel on which the above broadcast service session is being carried.

The protocol options that would require negotiation between the transmitter and the receiver are selected and defined in the service option description. The MS uses the SO number sent in the BSPM to discover the protocol options of the broadcast service. In contrast to a unidirectional packet data service wherein the SO specifies the protocols up to the IP network layer, the broadcast service specifies protocols up to the application layer. The security layer uses the encryption and authentication algorithms communicated during the establishment of a security association, e.g., via out-of-band means.

In the exemplary embodiment, the transport layer is specified in the SO as the applied transport protocol, such as RTP, may not be readily identified as the payload of the UDP packets. The SO will also specify a UDP port number for the RTP payload to distinguish this from other types of UDP traffic that may be sent over the broadcast channel.

The application layer is also specified in the SO as many audio and video codecs (e.g., MPEG-4 and EVRC) do not have static RTP payload types that are readily identified by the mobile station. In a unidirectional broadcast application, the RTP payload types for these codecs have to be dynamically assigned via call-set-up negotiation (e.g., using SIP, RTSP, etc.). Since the broadcast service desires to avoid such negotiation, the media decoders are preselected by the SO. Furthermore, since the audio and visual data may be carried in separate RTP packets, it is desired to specify the RTP payload types to be used by each media stream.

In the exemplary embodiment, the logical-to-physical mapping specifies the HSBS channel (HSBS_ID/BSR_ID) carried in a corresponding F-BSCH (FBSCH_ID). The set {HSBS_ID, BSR_ID, FBSCH_ID} completely specifies (for the MS) where to find and listen to a given broadcast service. As such, the logical-to-physical mapping information is transmitted over the air to the MSs such that a MS desiring to access to a given HSBS channel may determine the F-BSCH channel to monitor. Therefore, the following information is transmitted to the mobile station over the air interface: Broadcast physical channel parameters; Broadcast logical channel parameters; Logical-to-physical mapping; and One option to signal these broadcast service parameters is to define a new overhead message in cdma2000 that is specific to broadcast service.

An alternate embodiment applies the BSPM, wherein the individual parameters are transmitted in a Block Of Bits, referred to as BLOB that contains selectable program options. Unlike the use of a SO number to identify a set of parameters, wherein the protocol options at the application layer change often thus requiring redefinition, the use of the BLOB allows changes at the application layer without redefinition of the entire set of parameters. Specifically, the BLOB allows redefinition of a single parameter without changing the entire set of parameters. If the broadcast service is to support many different protocol options, the problem of defining multiple service options in the previous section can be mitigated by defining a broadcast service BLOB. This BLOB is sent as part of the BSPM and identifies the protocol options used for the broadcast service. FIG. 17 illustrates the protocol stack and application of the BLOB. The provision of the BLOB provides the advantage that the mobile station uses the BSPM to identify the protocol stack, and therefore, other out-of-band channels are not required for transmission of this information. Additionally, the mobile station can immediately determine the ability to access and decode the broadcast stream without having to register for the service.

A disadvantage of using the SO and/or the BLOB description is the use of wireless infrastructure to coordinate the protocols used above the IP network layer. The protocols used by the CS and PDSN must match those defined in the BLOB sent by the base station.

One means of providing coordination is to have a client in the wireless infrastructure (e.g., BSC) request the protocol option information from the CS and the PDSN. The BSC then translates this information into the corresponding broadcast service BLOB sent in the BSPM. The protocols used between the BSC client and the content server and PDSN will be based on standard protocols, such as those specified in cdma2000. The client in the BSC uses RTSP to request a description of the application and transport layers from the CS using SDP. The client also uses IPCP to request the header compression information from the PDSN. To limit the number of protocols the mobile station has to support, mandatory and optional protocol options should be defined for the broadcast service.

FIG. 18 illustrates a method 2000 of providing broadcast service parameter and protocol information using a BSPM. At step 2002 the MS receives the BSPM from the CS. The BSPM is as described hereinabove. The MS extracts the SO number from the BSPM at step 2004. The SO number is mapped to a set of parameters and protocols sufficient for the MS to receive the desired broadcast. The MS then initiates the protocol stack corresponding to the selected SO number at step 2008. Once the protocol stack is initiated, the MS is able to receive and decode information received on the broadcast channel at step 2010. Note that the BSPM is transmitted on a separate Walsh channel known to the subscribers.

FIG. 19 illustrates a mapping 2020 of each of the SO numbers to a set of parameters and protocols. When the CS initially schedules a broadcast, such as soccer match on a given day, the CS determines the parameters and protocols to be used for transmission of the broadcast from a set of previously standardized options.

In one embodiment, the SO number corresponds to a fixed set of protocols and parameters, wherein the mapping is known at the CS and at the MS. A prior knowledge of the mapping avoids the need to transmit the information, and thus reduces the transmission overhead, i.e., conserves bandwidth. The mappings are stored at the MS, and therefore are not readily changed or updated. If the CS is to use a combination of parameters that have not been previously standardized as a SO number, the standards organization must define a new profile of parameters before this combination of parameters can be used for the broadcast.

The use of a BLOB of information is illustrated in FIG. 20, wherein a broadcast session is assigned a set of parameters. Each parameter may be one of multiple options. The transmission of the parameters provides a level of flexibility in comparison to the use of fixed sets of parameters associated with a SO number. The CS may select any of the available options, and transmits the information to the MS. As illustrated, the FIELD 2 of the BLOB may be specified as any of the options: OPTION 1 to OPTION K, wherein each field of the BLOB may have a different number of available options.

An alternate embodiment provides the broadcast protocols and parameters via out-of-band signaling in the broadcast stream. In the present discussion, out-of-band indicates a separate channel used for communication of the overhead information. The separate channel may be a different frequency or may be a spread-spectrum channel, such as a channel defined by a different Walsh code. The system provides the broadcast parameter and protocol information to the subscriber when the subscriber initiates a packet data call. The subscriber or MS first requests header compression information from the PDSN. Using the information received from the PDSN, the MS is able to receive the broadcast overhead information. The MS contacts the CS via IP type protocols, e.g., RTSP or SIP, to receive a description of the transport and application layers. The MS uses this information to receive, decode and process a broadcast session.

Figure 21:
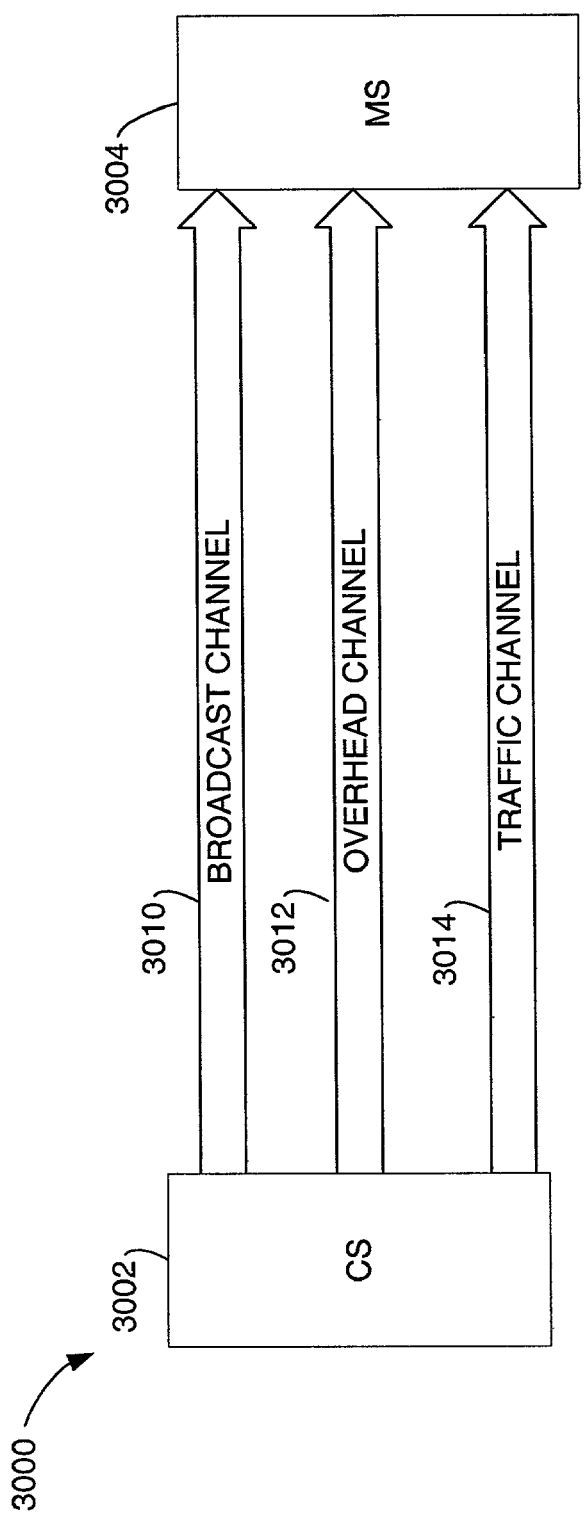
FIG. 21 is a block diagram of channels used for a wireless communication system supporting broadcast services.

FIG. 21 illustrates the various channels used for transmission of various information in a broadcast system. As illustrated the system 3000 includes a CS 3002 and a MS 3004, communicating via a broadcast channel 3010, an overhead channel 3012, and a traffic channel 3014. Broadcast content of a given broadcast session is transmitted on the broadcast channel 3010, which may be a uniquely assigned frequency or may be a uniquely assigned Walsh channel. Transmission of a BSPM message is provided on the overhead channel 3012. The traffic channel 3014 is used for transmission of the out-of-band signaling, such as communication between CS and MS, and communications between PDSN (not shown) and MS.

The MS is able to contact the CS and PDSN directly using the out-of-band signaling over a packet data service option. The out-of-band communication allows the CS to update the information without transmitting via the BS, as the out-of-band communication is directly between the MS and the PDSN or the MS and the CS. Note that when using the packet data service as the out-of-band means, the communication between the MS and CS still passes through the BS. However, the BS does not require knowledge of the payload, thus making it unnecessary to coordinate the CS and BS protocols.

To avoid the disadvantages of the out-of-band methods of transmitting the protocols and parameters to the receivers, the SDP description from the CS can be multiplexed into the broadcast stream. This allows the mobile station to determine the protocol options used by the CS without setting up a packet data call.

The SDP description is sent as frequently as a short-term encryption key (SK) in the broadcast stream. The rate of sending these updates will be limited by the amount of bandwidth available for such updates. For example, if the SDP description is 300 bytes in size and sent every 3 seconds, the required bandwidth is 800 bps. Note that since the SDP description originates from the content server, the content server can improve the media quality by multiplexing the SDP message into the broadcast stream when the media bandwidth is low enough to accommodate it. Effectively the SDP information may be adaptively based on bandwidth conditions. Therefore, as the channel condition and or stresses on the bandwidth of the system change, the frequency of SDP transmission may change also. Similarly, it may be possible to change the size of the SDP by adjusting the information contained therein specific to a given system.

The SDP description is typically transported in RTSP, SAP, or SIP messages. To avoid the overhead of such protocols, it is recommended that the SDP description be transported directly over UDP by identifying a well-known UDP port number to carry the SDP message. This port number must not be used to carry RTP or other types of UDP traffic sent over the broadcast channel. The UDP checksum will provide error detection for the SDP payload.

Figure 22:
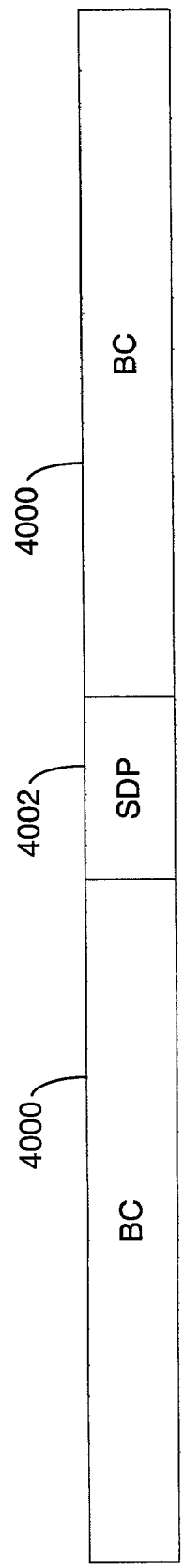
FIG. 22 is a broadcast stream with overhead information interleaved with broadcast content.

According to one embodiment illustrated in FIG. 22, the system provides the broadcast protocols and parameters via in-band signaling in the broadcast stream. The broadcast stream 4000 contains the broadcast content and is transmitted on the broadcast channel, such as broadcast channel 3010 of FIG. 21. Interspersed throughout the broadcast stream 4000 is SDP 4002.

Figure 23:
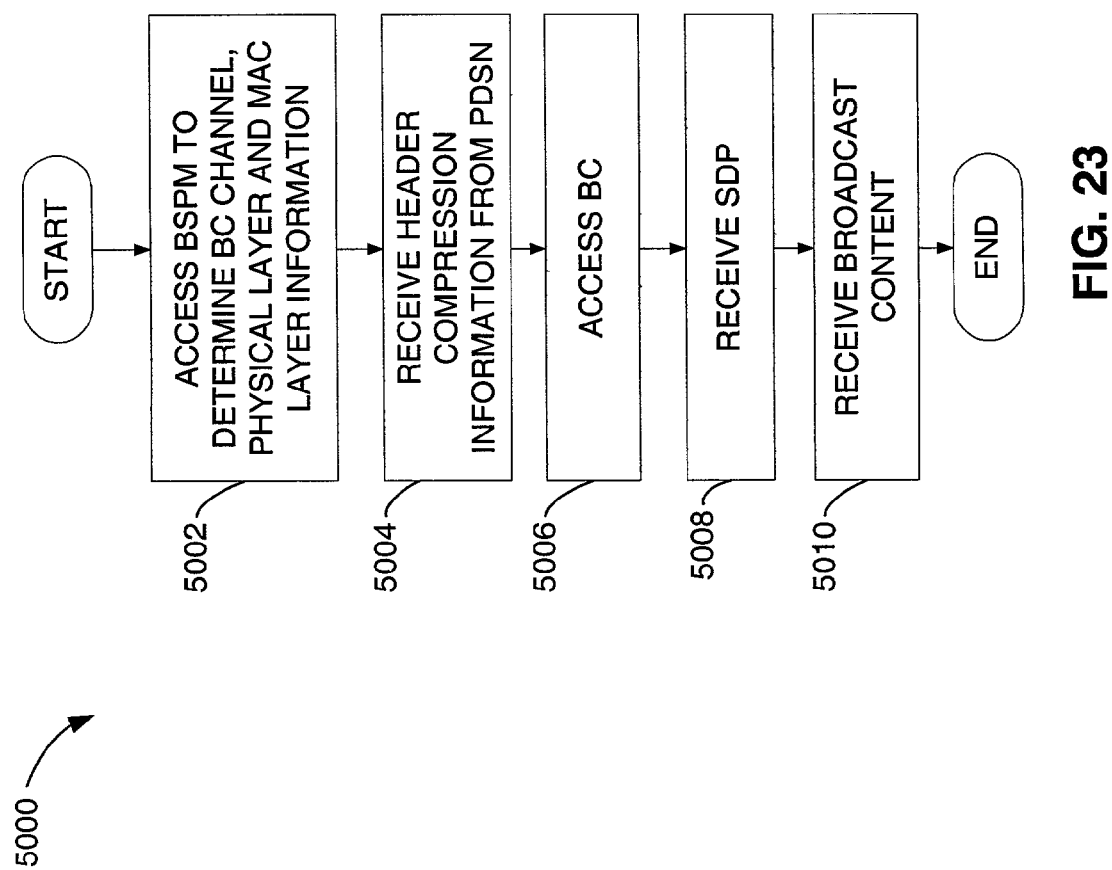
FIG. 23 is a method for accessing a broadcast service in a wireless communication system.

FIG. 23 illustrates a method 5000 of providing broadcast service parameter and protocol information using an in-band method, wherein the overhead type information is provided with the broadcast content on the broadcast channel. The term in-band is intended to indicate that overhead type information is provided on the same channel as the broadcast content and thus does not require a separate transmission mechanism, i.e., channel. The method 5000 first accesses the BPSM at step 5002. The MS extracts the broadcast channel information, the physical layer information, and the MAC layer information from the BSPM. Header compression information is received directly from the PDSN at step 5004. This can be done by either having the MS directly contact the PDSN via a packet data service option (out-of-band) or by having the PDSN insert the header compression configuration information into the broadcast stream to the MS. At step 5006 the MS accesses the Broadcast Content (BC). In response to receipt of the header compression information, the MS is able to receive the SDP transmitted on the broadcast channel with the broadcast content at step 5008. The SDP contains parameters and protocols for receiving the associated broadcast session. The MS applies the information contained in the SDP to receive, decode, and process broadcast content received on the broadcast channel.

Figure 24:
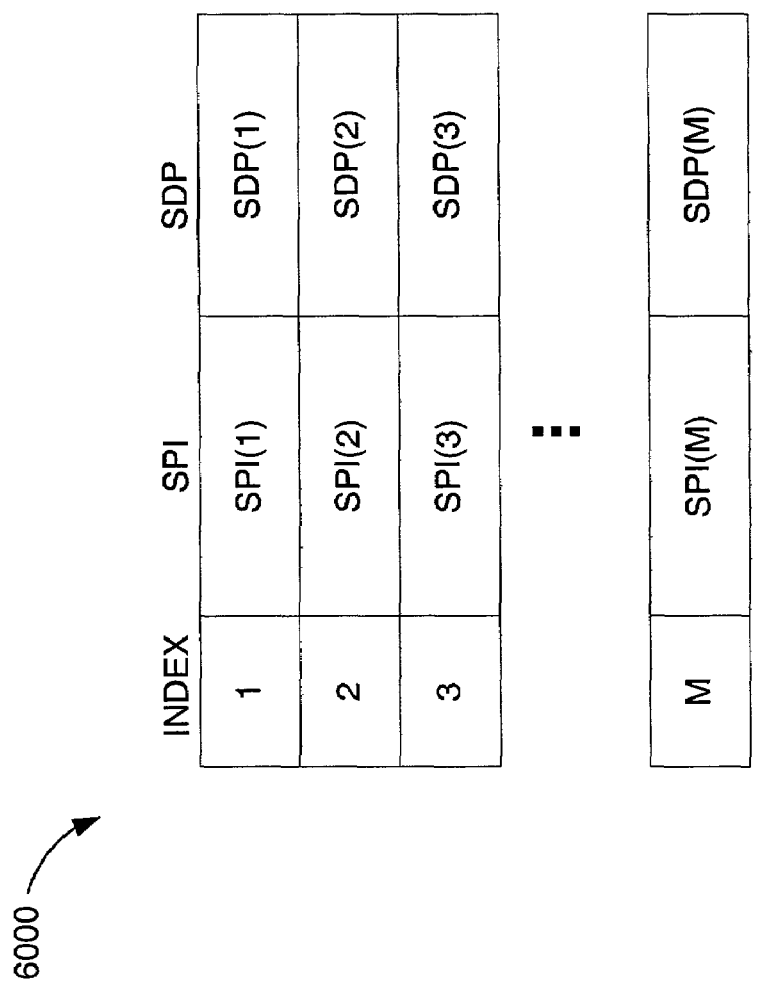
FIG. 24 is a memory element for storing broadcast overhead information.

When a subscriber to the broadcast service desires to change to another broadcast session, the set-up and/or initiation of the new broadcast session may introduce unacceptable delays to the subscriber. One embodiment provides a memory storage unit at the receiver, wherein at least a portion of the information is stored at the receiver and may be used to quickly change from one broadcast session, i.e., program, to another, or alternately, may be used to recall a previously accessed broadcast session. FIG. 24 illustrates a memory storage 6000 that stores the SPI and SDP corresponding to each broadcast session accessed. The overhead information corresponding to a current broadcast session is stored in memory 6000, wherein the stored information is the last received information. In one embodiment, the memory storage 6000 is a First In First Out (FIFO) memory storage unit. In an alternate embodiment, a cache memory is used. In still another embodiment, a Look Up Table (LUT) stores information relating to accessed broadcast sessions.

In embodiments using mechanisms such as cache memory and/or LUT, the MS uses a simple time-stamp algorithm to maintain only one copy of the most recent SPI-SDP configurations in memory. For each SPI-SDP pair, the MS maintains a time stamp of when the MS received the description last. If the MS detects an SPI that already exists in its memory, it uses the stored configuration and updates the time stamp to the present time. If the detected SPI is not in the MSs memory, the MS replaces the oldest SPI-SDP entry in its memory with the newly detected SPI-SDP pair. The MS now uses this new configuration to decode the broadcast stream.

Message Flow

Figure 5:
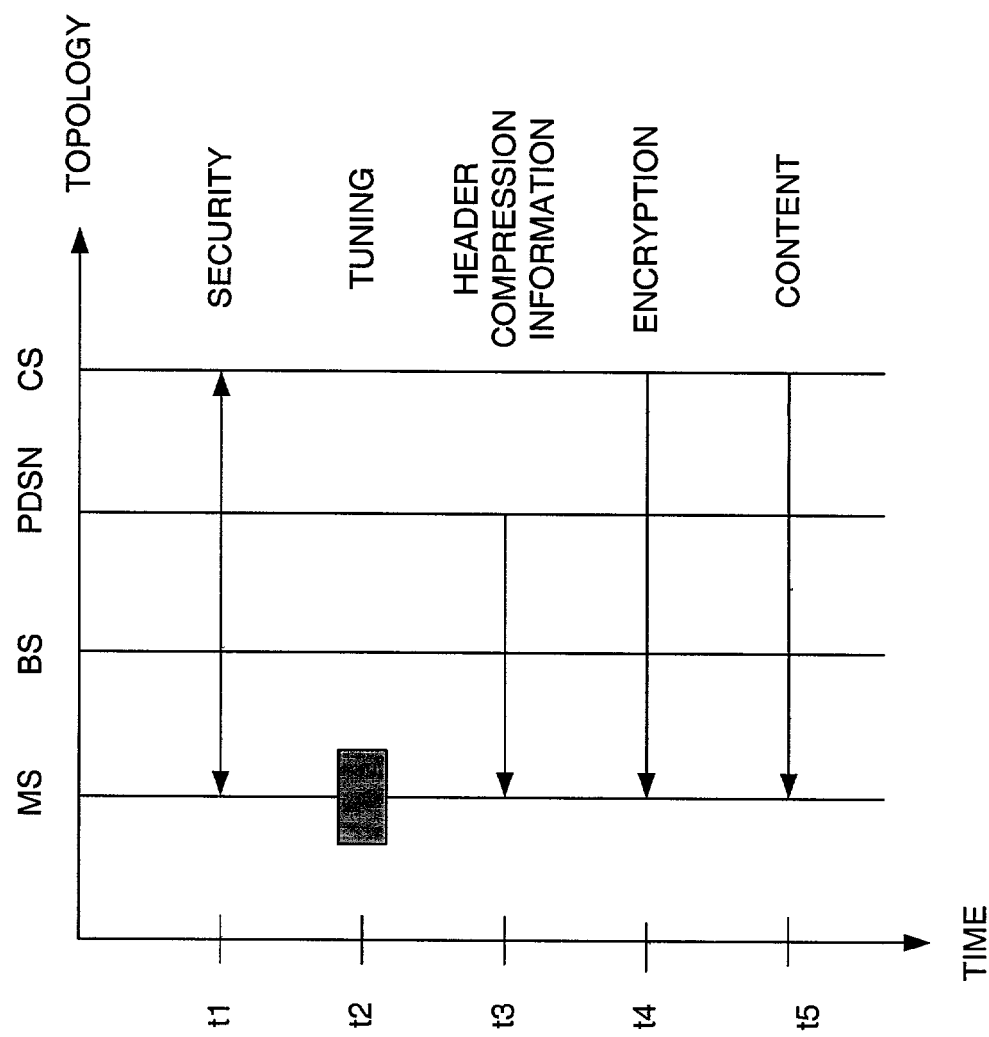
FIG. 5 is a flow diagram for accessing a broadcast service in a wireless communication system topology.
Figure 6:
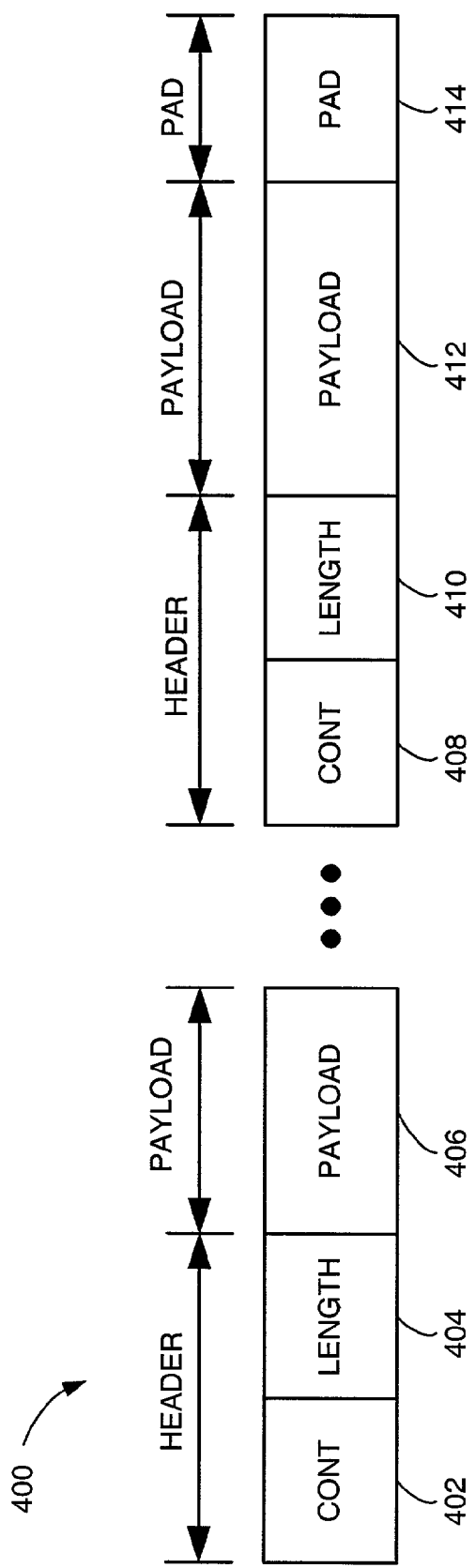
FIG. 6 is a broadcast stream in a wireless communication system.

FIG. 5 illustrates the call flow for accessing a broadcast session in the exemplary embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to the exemplary embodiment, the CS provides the encryption information over a dedicated channel during a packet data session, such as via PPP, WAP, or other out-of-band methods.

At time t2 the MS tunes into the broadcast channel and starts to receive packets. At this point in time, the MS is enabled to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Compression

According to the exemplary embodiment, broadcast content is transmitted on a dedicated broadcast channel. The transport layer provides encryption overhead for carrying broadcast content in IP packets. The system supports data compression, and specifically header compression. The decision to compress data depends on the required average throughput (including transport/encryption overhead, data link layer overhead, and physical layer overhead) and user perception of the broadcast quality. Carrying more broadcast content in each IP packet reduces overhead and thus reduces the broadcast channel bandwidth. In contrast, compression increases the Packet Error Rate (PER) that affects user perception. This is due to the transmission of each long IP packet spanning multiple physical layer frames and thus is associated with increases in the Frame Error Rate (FER). If a carrier decides to use small IP packets to improve broadcast quality, the carrier may choose header compression to reduce the transport and encryption overhead of the IP packet.

The RTP/UDP/IP protocols are used to transport broadcast content from the CS to MS, and the content is protected by the ESP in transport mode. The transport overhead is the RTP/UDP/IP header and is 40 bytes per IP packet data. The encryption overhead is in the form of ESP header, Initialization Vector (IV), and ESP trailer. The ESP header and IV are inserted between the IP header and UDP header. The ESP header consists of the SPI (4 bytes) and Sequence Number (4 bytes). The length of IV is specific to which encryption algorithm is used. For the AES Cipher Algorithm, the length of IV is 16 byte. The ESP trailer is appended to the end of the UDP datagram and consists of the padding, next header (1 byte), and padding length (1 byte). Since the cipher block size of the AES algorithm is 16 bytes, the padding size ranges from 0 to 15 bytes. Taking the ceiling function of the average padding size yields 8 bytes. For an IP packet the total overhead due to transport and encryption ranges from 66 to 81 bytes with the average of 74 bytes not including the data link layer overhead from the PDSN to the MS.

Header compression such as the Robust Header Compression (ROHC) may be used to reduce the IP header and the SPI field of the ESP Header from 24 bytes to 2 bytes. The Sequence Number of the ESP header is not compressed, because it is used to sequence the compressed packets. The IV is not compressed, because it changes randomly for every packet. The UDP/RTP header and ESP trailer cannot be compressed because they are encrypted. Therefore, if ROHC is used to compress the IP/ESP header, the average overhead due to transport and encryption is reduced from 74 bytes to 52 bytes per IP packet.

Figure 7:
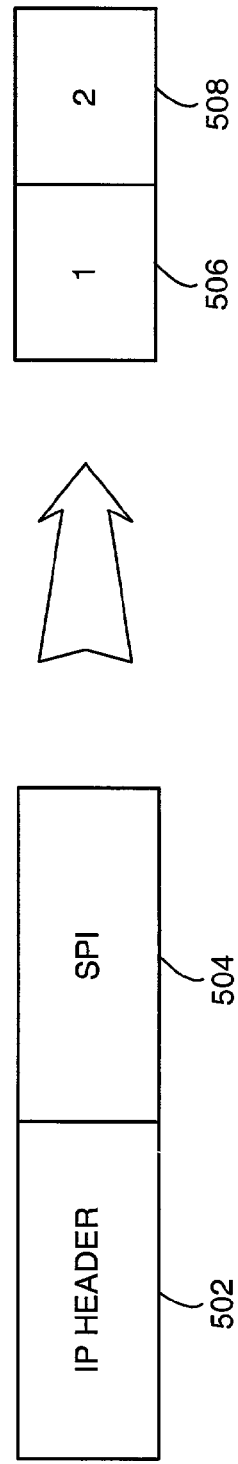
FIG. 7 is a header compression mapping in a wireless communication system.
Figure 8:
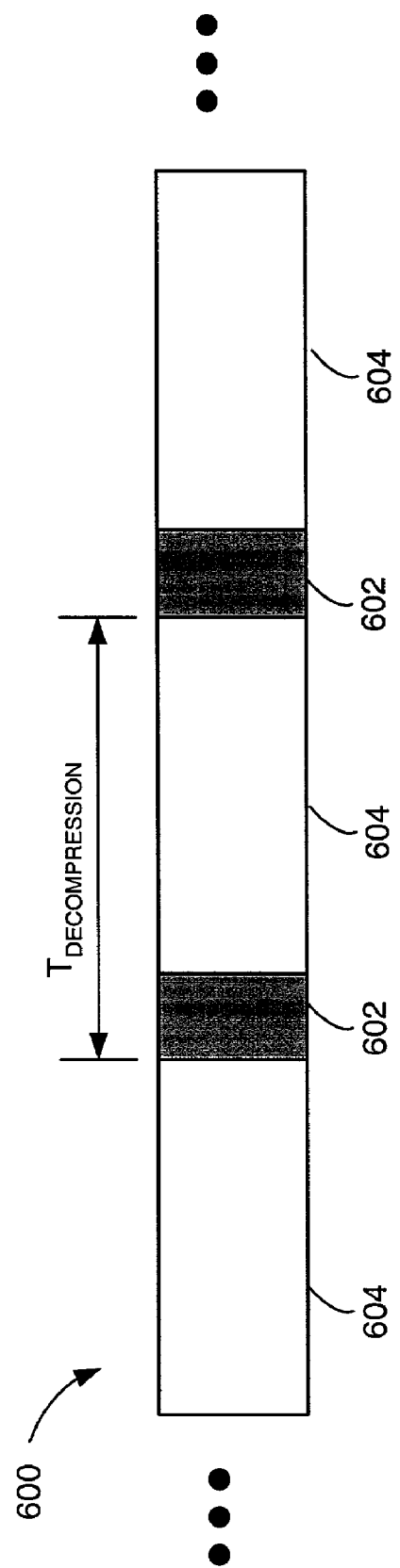
FIG. 8 is a periodic broadcast of header compression information.

According to the exemplary embodiment, header compression, such as the Robust Header Compression (ROHC), is applied so as to avoid propagating decompression errors. As illustrated in FIG. 7, the header information is compressed from 24 bytes down to 2 bytes. The header 500 includes an IP header 502 and a SPI portion 504. The compression algorithm results in a 2-byte result after compression. In contrast to conventional header compression, wherein some type of negotiation is required between the MS and the PDSN or other infrastructure element, the exemplary embodiment provides a unidirectional transmission of compression information. The MS does need to request the compression information, i.e., header compression parameters sufficient for decompression of the received information at the MS. Rather, the PDSN provides the compression information periodically as illustrated in FIG. 8. The PDSN provides the compression information on the broadcast channel interspersed with broadcast content. The provision of control information within a data stream is referred to as "in-band" as a separate channel is not required. As illustrated, the broadcast stream 600 includes broadcast content portions 604 and decompression information, i.e., compression information, 602. The decompression information is provided having a period of $T_{DECOMPRESSION}$. Alternate embodiments may provide the decompression information on occurrence of a predetermined event rather than periodically. As the MS does not request the decompression information, the PDSN supplies the information with a frequency that prevents delays in accessing the broadcast content. In other words, the PDSN should provide the information often, so that an MS may access the broadcast at any time without having to wait for decompression information.

Note that ROHC may be operated in a unidirectional mode, wherein, packets are sent in one direction only: from compressor to decompressor. In this mode, therefore, makes ROHC usable over links wherein a return path from decompressor to compressor is unavailable or undesirable. Before the MS can decompress packets received from the broadcast channel, the state of decompressor is initialized. The Initialization & Refresh (IR) packet is used for this purpose. There are two alternatives for the ROHC initialization.

The subscriber "tunes" to the broadcast channel and waits for the ROHC IR packets periodically sent by the ROHC compressor in the PDSN. Frequent ROHC IR packets may be needed for the MS to start decompressing received packets quickly. Frequent ROHC IR packets may use too much bandwidth in the broadcast channel. An IR packet is about 30 bytes for the IP/ESP compression profile. If an IR packet is sent once every 250 ms., the process consumes about 1 kbps in the broadcast channel. Losing IR packets over the air would further delay the MS to acquire ROHC initialization.

If decompression goes out-of-sync, due to packet loss, or residual error in the received compressed header, or failure, etc., the resultant decompression error may propagate until decompression is re-synchronized or re-initialized. An ROHC compressed header contains a Cyclic Redundant Check (CRC), which is calculated over the entire header before compression. This CRC allows decompression to perform a local context repair that brings the context in sync (in the events of packet loss and residual error). When decompression recovers from a failure, periodic IR packets effectively reinitialize the decompression process.

Transport Layer

A data link layer framing protocol or transport layer protocol is applied between the PDSN and the MS to delineate packets received from the broadcast channel. With reference to FIG. 3, information in the transport layer, identified as LINK LAYER, is provided between the PDSN and the MS. The framing information is generated at the PDSN and is provided to the MS via the BS. The PDSN receives IP streams from the CS and frames the IP streams according to a predetermined framing protocol. As illustrated in the exemplary embodiment, the PDSN applies a framing protocol version of the High-Level Data Link Control (HDLC). The HDLC specified in the ISO standard corresponds to Layer 2 of the International Standards Organization (ISO) 7-layered architecture, wherein Layer 2 is referred to as the Data Link Layer. The HDLC protocol seeks to provide error-free movement of data between network nodes. To this end, the HDLC layer is designed to ensure the integrity of data passed to a next layer. In other words, the framing protocol seeks to reproduce the data received exactly as the data was originally transmitted, without errors, without loss of information, and in the correct order.

Figure 9:
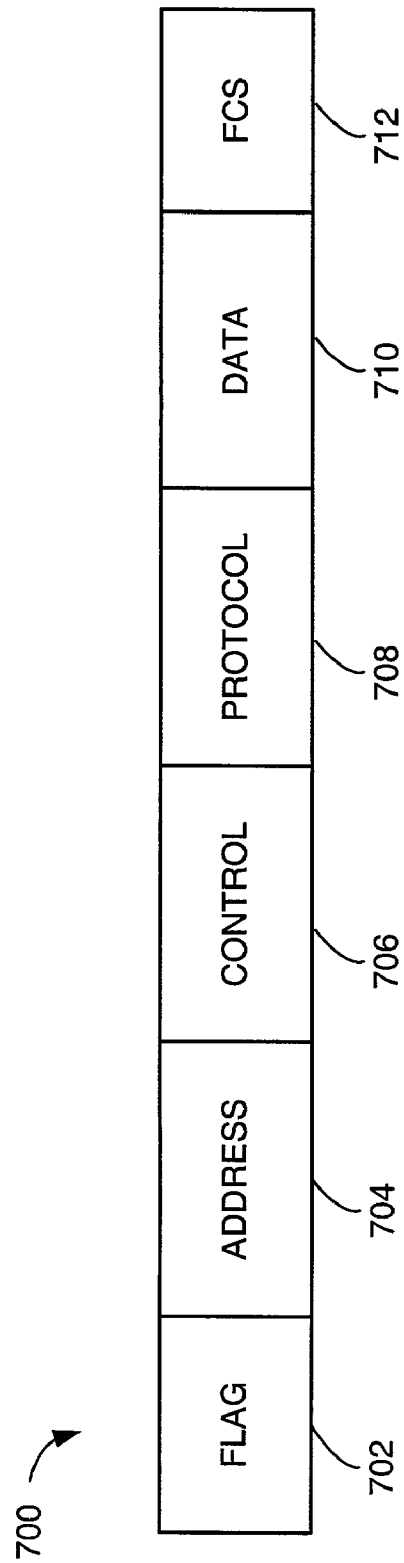
FIG. 9 is a header compression protocol.

The exemplary embodiment applies a version of HDLC framing that applies a subset of the HDLC defined parameters. FIG. 9 illustrates one embodiment of HDLS framing, wherein frame 700 includes a plurality of fields as defined by the HDLC protocol outlined in RFC 1662. Field 702 defines a FLAG or indication of a start of frame. The FLAG has a designated bit length and is defined by a predetermined pattern of bits. The HDLC is convenient to apply as the HDLC is a commonly available standardized protocol. One disadvantage of the full HDLC framing protocol is the processing time required to generate the frames at the transmitter and to retrieve the frames at the receiver.

In particular, the HDLC protocol is considered processor intensive as further processing is used to ensure the payload does not include the same sequence of bits as the FLAG. At the transmitter, if a FLAG sequence of bits is detected in the payload, an escape character is inserted into the payload to identify the FLAG as part of the payload and not indicating a start of frame. The process of adding an escape character is referred to as "escaping" hexadecimal patterns of 0×7E and 0×7D in the frame payload. An alternative method referred to as the Efficient Framing Protocol that is less processor intensive than the HDLC-like framing is described hereinbelow. FIG. 9 illustrates the options of using HDLC framing to transport PPP frame. For the HSBS operation, the HDLC-like framing overhead can be reduced by eliminating field that are not required, or have little meaning and/or provide little information, for a uni-directional broadcast. As described hereinabove, the FLAG is a predetermined sequence of bits indicating the beginning of an HDLC frame. The exemplary embodiment incorporates a FLAG or other start of frame indicator 802, as illustrated within the format 800 of FIG. 10. In contrast to the format of FIG. 9, the end of a frame is not indicated with overhead information in the exemplary embodiment. As the address and control fields of the format 700 have static values, these are not included in the format 800.

Figure 10:
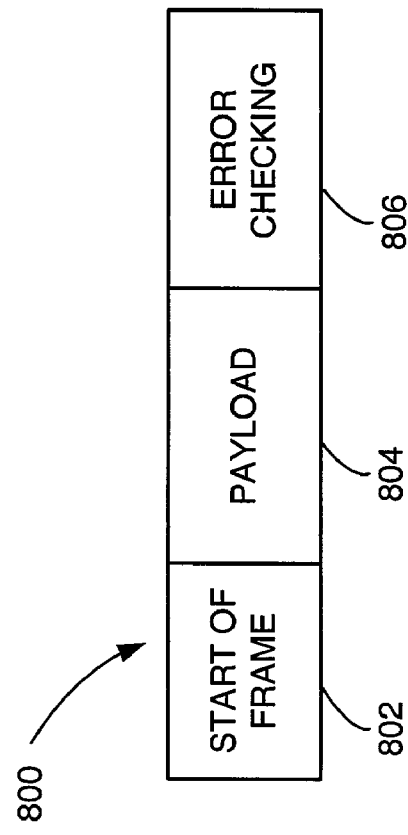
FIG. 10 is a header compression protocol for broadcast service in a wireless communication system.

Continuing with FIG. 10, as the purpose of the Protocol field 708 (FIG. 9) is to identify the payload type, such as LCP control packet, ROHC packet, IP packet, etc., this discriminator is not required for broadcast operation as all packets in the broadcast channel belong to the same type. For example, if ROHC compression is used for packet transmission, all packets in the broadcast channel are processed as ROHC packets. The types of ROHC packets, such as IR packet, compressed packet, etc., are distinguished by the Packet Type field in the ROHC packet header. Therefore, the Protocol field is not included in format 800. Further, the format 800 includes an error checking field 806 after the payload 804. The error checking field 806 provides information to the receiver to allow the receiver to check for errors in the received payload. The exemplary embodiment incorporates a Frame Check Sum (FCS) which may be specified as null, 16 bits, or 32 bits. Since an HDLC frame may span multiple physical-layer frames in the broadcast channel, it is recommended to use a 16-bit FCS.

The octet stuffing procedure defined in RFC 1662 is also applied to the exemplary embodiment, wherein after the FCS computation, the HDLC transmitter in the PDSN examines each byte in the HDLC frame (excluding the Flag) for the patterns of 0×7E and 0×7D. The pattern 0×7E will be encoded as 0×7D and 0×5E, and the pattern 0×7D will be encoded as 0×7D and 0×5D. The HDLC transmitter will not encode any other patterns. This implies that the Async-Control-Character-Map (ACCM) as defined in RFC 1662 is set to all zero.

The HDLC framing overhead is 3 bytes plus the octet stuffing overhead. Assuming the byte pattern is uniformly distributed, the average octet stuffing overhead is one byte per 128-byte of HDLC frame. For example, if the payload is 256 bytes, the HDLC framing overhead is 5 bytes on the average.

Figure 11:
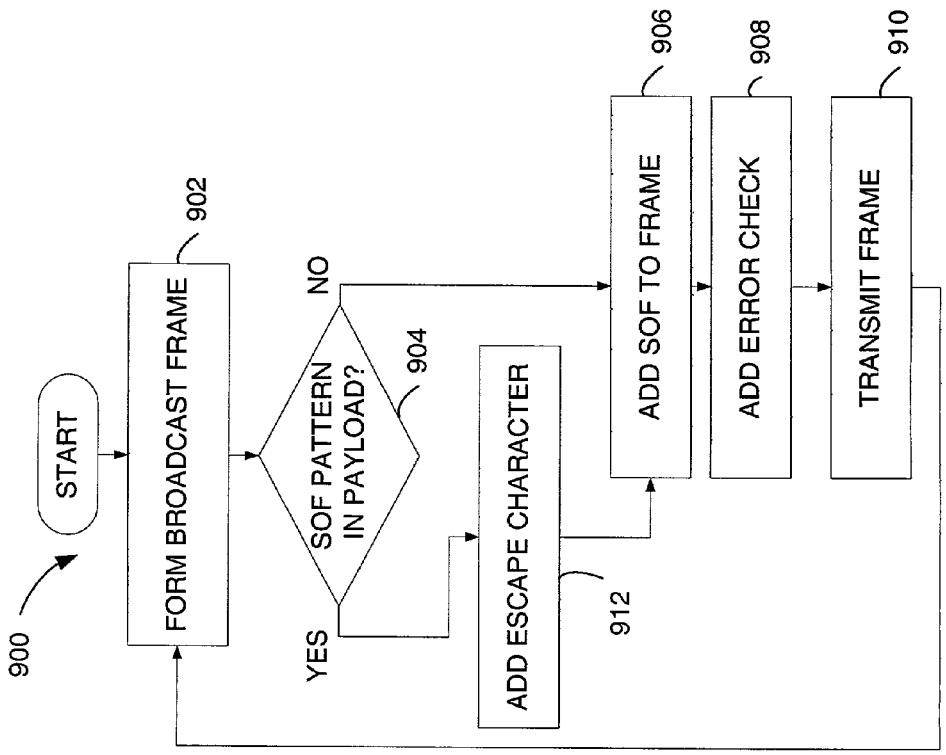
FIG. 11 is a flow chart of header compression for broadcast service in a wireless communication system.
Figure 13:
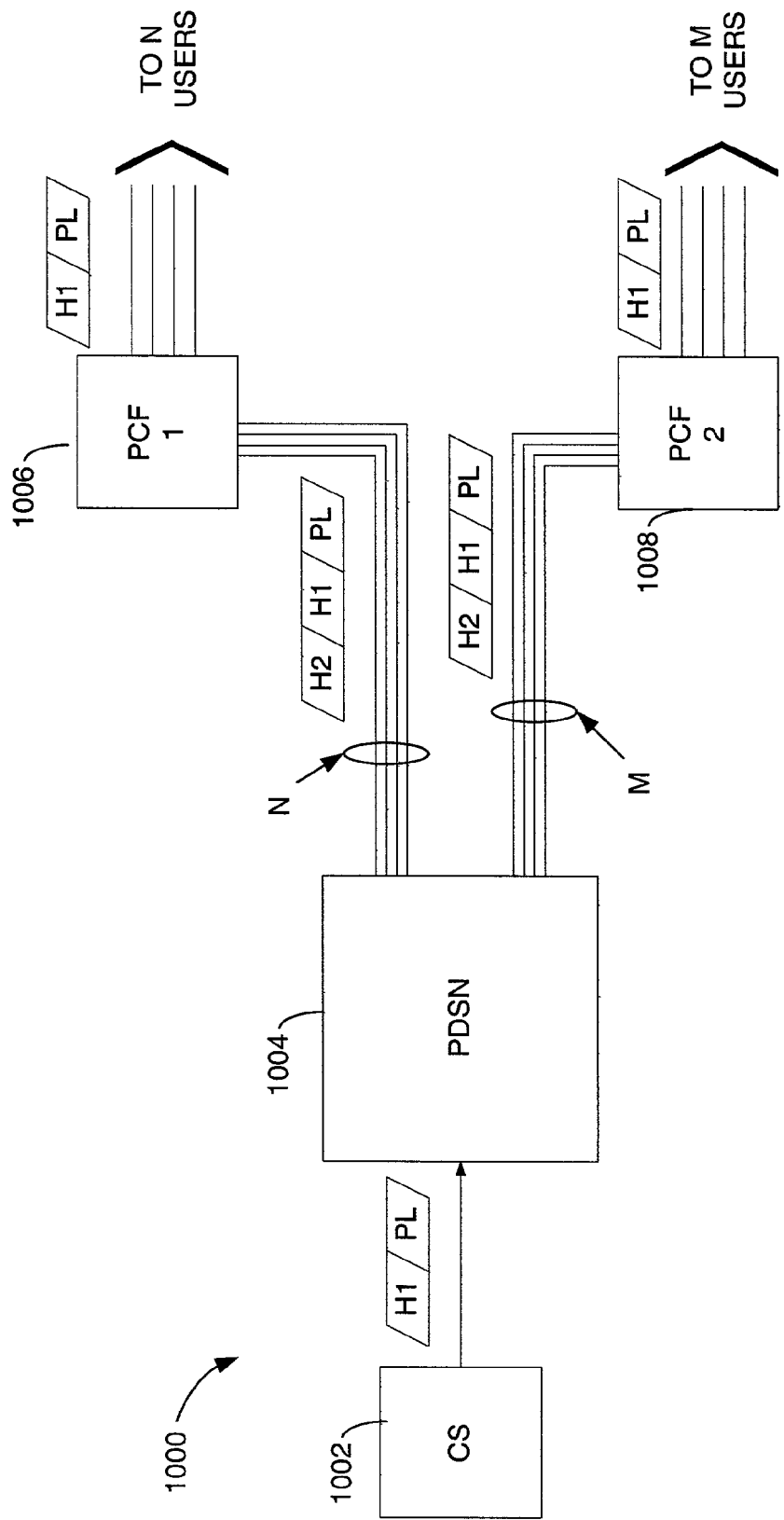
FIGS. 13 and 14 illustrate data transport in a wireless communication system.
Figure 14:
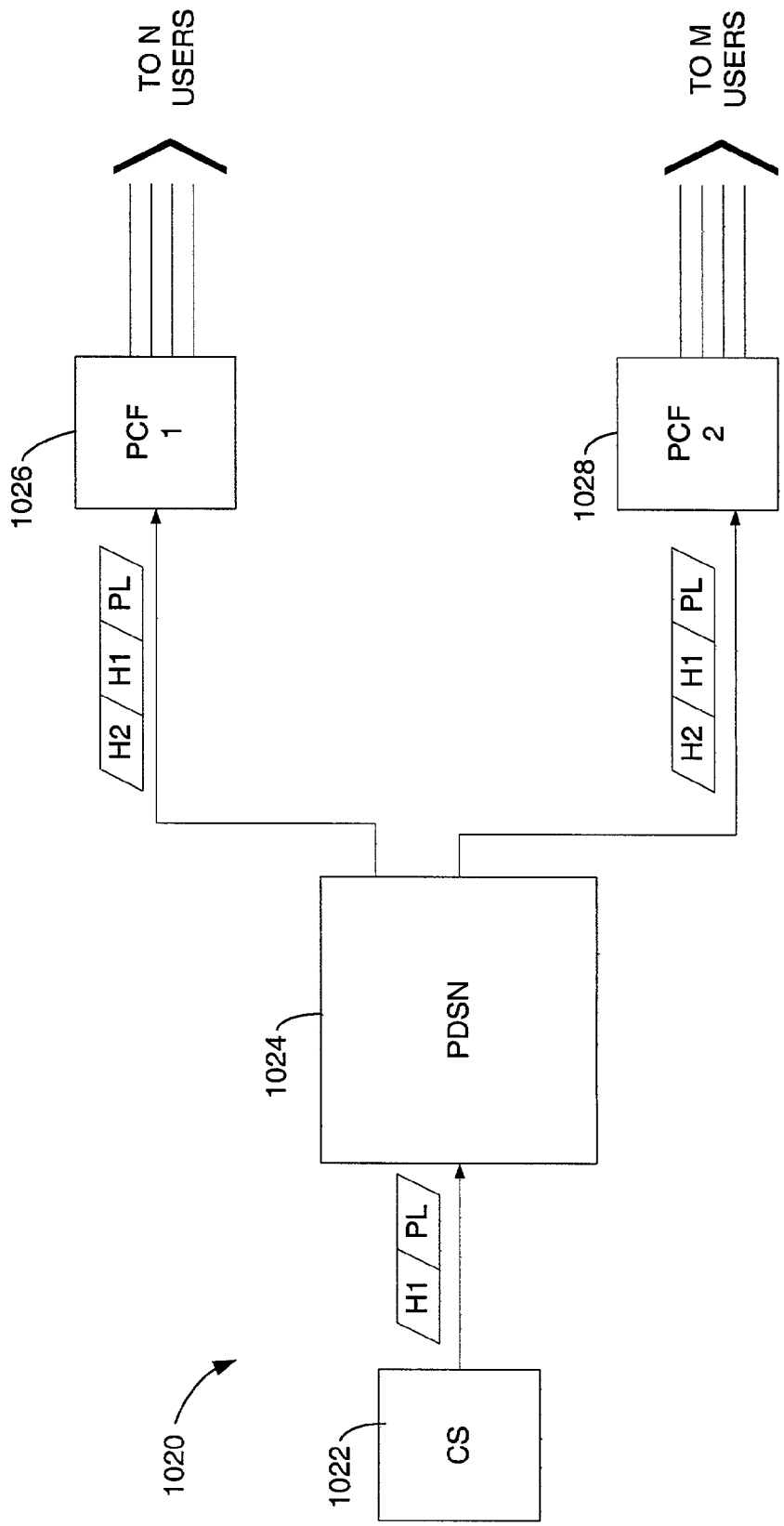

FIG. 11 is a flow diagram of a framing method 900 performed at the transmitter. The transmitter forms the broadcast frame at step 902 by determining a payload portion of the packetized data and generating a Start Of Flag (SOF). The transmitter then checks the frame for any SOF sequences contained in the payload 904. If an SOF sequence is found in the payload, the transmitter adds an escape character at step 912. Else, the transmitter appends the SOF to the payload at step 906 and provides an error checking mechanism at step 908. The frame is transmitted at step 910. The transmitted frame has the format 800 of FIG. 10. Alternate embodiments may implement other fields within the framing format and may incorporate any form of classifier to locate a SOF sequence in the payload.

Figure 12:
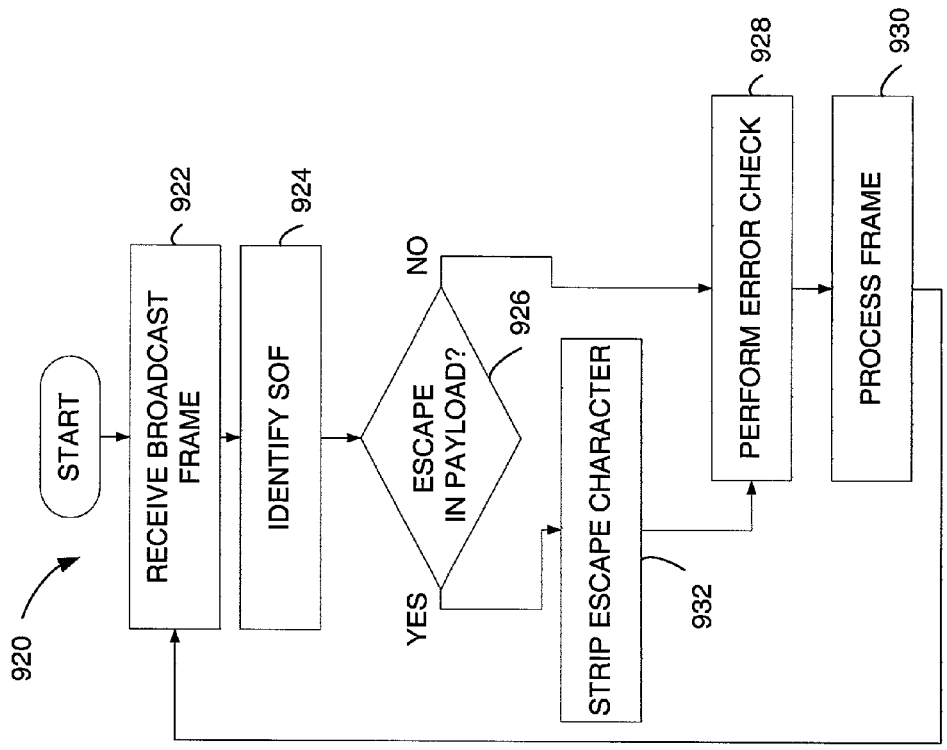
FIG. 12 is a flow diagram of header decompression for broadcast service in a wireless communication system.

FIG. 12 is a flow diagram of a de-framing method 920 performed at the receiver. The process starts on receipt of a broadcast frame at step 922. The receiver identifies a SOF at step 924, and checks for escape characters in the payload at decision diamond 926. If an escape character, or other SOF sequence identifier, is found in the payload, the receiver strips the escape character at step 932. Else, the receiver performs an error check at step 928 and processes the frame at step 930.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a broadcast service in a wireless communication system, comprising:

tuning to an overhead channel for a broadcast service message;

retrieving from said broadcast service message a plurality of parameters for access of a broadcast channel for said broadcast service, said plurality of parameters including a broadcast service reference identifier specifying where to find the broadcast channel;

accessing said broadcast channel based on said plurality of parameters; and receiving broadcast content from said broadcast channel.

2. The method as in claim 1 wherein said plurality of parameters includes physical-layer parameters of said communication system, said method further comprising accessing said broadcast channel based on said physical-layer parameters.

3. The method as in claim 2 wherein said physical-layer parameters include a channel identifier.

4. The method as in claim 2 wherein said physical-layer parameters include a radio configuration and a data rate for said broadcast channel.

5. The method as in claim 1 wherein said plurality of parameters includes a service option number, said method further comprising processing a protocol stack based on said service option number.

6. A method for broadcast in a wireless communication system, comprising:

broadcasting a broadcast service message via an overhead channel for multiple and direct reception, said broadcast service message includes physical-layer parameters of a broadcast channel in said communication system including a broadcast service reference identifier specifying where to find the broadcast channel; and broadcasting broadcast content of said broadcast via said broadcast channel which is accessible based on said physical-layer parameters.

7. An apparatus for a broadcast service in a wireless communication system, comprising:

means for tuning to an overhead channel for a broadcast service message;

means for retrieving from said broadcast service message a plurality of parameters for access of a broadcast channel for said broadcast service, said plurality of parameters including a broadcast service reference identifier specifying where to find the broadcast channel;

means for accessing said broadcast channel based on said plurality of parameters; and means for receiving broadcast content from said broadcast channel.

8. The apparatus as in claim 7 wherein said plurality of parameters includes physical-layer parameters of said communication system.

9. The apparatus as in claim 8 wherein said physical-layer parameters include a channel identifier.

10. The apparatus as in claim 8 wherein said physical-layer parameters include a radio configuration and a data rate for said broadcast channel.

11. The apparatus as in claim 7 wherein said plurality of parameters includes a service option number for processing a protocol stack based on said service option number.

12. An apparatus for broadcast in a wireless communication system, comprising:

means for broadcasting a broadcast service message via an overhead channel for multiple and direct reception, said broadcast service message includes physical-layer parameters of a broadcast channel in said communication system including a broadcast service reference identifier specifying where to find the broadcast channel; and means for broadcasting broadcast content of said broadcast via said broadcast channel which is accessible based on said physical-layer parameters.

* * * * *